(12) United States Patent
Yoshimi et al.

(10) Patent No.: US 11,141,837 B2
(45) Date of Patent: Oct. 12, 2021

(54) ATTACHMENT/DETACHMENT STRUCTURE FOR CLAMP ARM OF CLAMPING DEVICE

(71) Applicant: KOSMEK LTD., Hyogo (JP)

(72) Inventors: Masahiro Yoshimi, Hyogo (JP); Keitaro Yonezawa, Hyogo (JP); Kenta Otani, Hyogo (JP)

(73) Assignee: KOSMEK LTD., Kobe (JP)

( * ) Notice: Subject to any disclaimer, the term of this patent is extended or adjusted under 35 U.S.C. 154(b) by 345 days.

(21) Appl. No.: 15/559,970

(22) PCT Filed: May 30, 2016

(86) PCT No.: PCT/JP2016/065860
§ 371 (c)(1),
(2) Date: Sep. 20, 2017

(87) PCT Pub. No.: WO2016/194863
PCT Pub. Date: Dec. 8, 2016

(65) Prior Publication Data
US 2018/0071894 A1 Mar. 15, 2018

(30) Foreign Application Priority Data

Jun. 3, 2015 (JP) .................................. 2015-125133
Aug. 5, 2015 (JP) .................................. 2015-164208
Sep. 4, 2015 (JP) ............................. JP2015-188854

(51) Int. Cl.
*B25B 5/02* (2006.01)
*B23Q 3/06* (2006.01)
(Continued)

(52) U.S. Cl.
CPC ................. *B25B 5/02* (2013.01); *B23Q 3/06* (2013.01); *B25B 5/10* (2013.01); *B25B 5/16* (2013.01)

(58) Field of Classification Search
CPC .... B25B 5/02; B25B 5/10; B25B 5/16; B23Q 3/06
(Continued)

(56) References Cited

U.S. PATENT DOCUMENTS 1,662,173 A * 3/1928 Schneider ............... B25B 5/107
269/93
2,671,482 A * 3/1954 Gordon ................... B25B 1/125
269/182
(Continued)

FOREIGN PATENT DOCUMENTS

CN 04493044 A 4/2015
JP H05-19716 U 3/1993
(Continued)

OTHER PUBLICATIONS

Office Action dated Nov. 29, 2018, in corresponding Chinese application No. 201680026422.3.
(Continued)

*Primary Examiner* — Tyrone V Hall, Jr.
*Assistant Examiner* — Joel D Crandall
(74) *Attorney, Agent, or Firm* — Bacon & Thomas, PLLC

(57) ABSTRACT

A clamp rod (2) is inserted into a housing so as to be movable in a vertical direction. An attachment hole (6) is provided at a left end portion (3a) of a clamp arm (3), which is attachable to and detachable from the clamp rod (2). The attachment hole (6) passes through the left end portion in the vertical direction. An accommodation hole (8) is provided at a position to the upper right of the attachment hole (6). A transmission member (10) and a wedge member (15) configured to be brought into wedge engagement with the transmission member (10) from above are inserted into the accommodation hole (8). At the time of attaching the clamp arm (3) to the clamp rod (2), the wedge member (15) is
(Continued)

pressed downward using a tightening bolt (21), and thereby the wedge member (15) presses the attachment hole (6) via the transmission member (10) and the clamp rod (2), and presses the accommodation hole (8).

8 Claims, 13 Drawing Sheets

(51) Int. Cl.
  *B25B 5/10* (2006.01)
  *B25B 5/16* (2006.01)
(58) Field of Classification Search
  USPC ....... 411/75, 76, 77, 78, 79, 80, 26, 35, 354, 411/355, 367, 368; 403/367, 368, 370
  See application file for complete search history.

(56) References Cited

U.S. PATENT DOCUMENTS

| | | | | |
|---|---|---|---|---|
| 2,768,847 A * | 10/1956 | Peyrin | ................ | F16D 1/05 285/368 |
| 3,358,549 A * | 12/1967 | Lerich | ................ | E21D 21/008 411/24 |
| 3,570,836 A * | 3/1971 | Pettavel | ................ | B25B 1/125 269/92 |
| 3,841,774 A | 10/1974 | Maxey | | |
| 4,059,934 A * | 11/1977 | Hayamizu | ............ | A63B 71/028 52/297 |
| 4,268,185 A * | 5/1981 | Mullenberg | ............ | F16D 1/093 403/16 |
| 5,247,846 A * | 9/1993 | Grossmann | ............ | B25B 1/125 269/221 |
| 6,669,399 B2 * | 12/2003 | Janek, Jr. | ................ | B21D 28/34 403/374.2 |
| 2012/0096700 A1* | 4/2012 | Patterson | ................ | F16L 21/08 29/428 |
| 2014/0271027 A1* | 9/2014 | Daniels | ................ | F16B 2/16 411/166 |

FOREIGN PATENT DOCUMENTS

| | | |
|---|---|---|
| JP | H08-105411 A | 4/1996 |
| JP | 2004-223640 A | 8/2014 |

OTHER PUBLICATIONS

Office Action dated Jan. 20, 2020, in corresponding Chinese application No. 201680026422.3.
Office Action dated Jul. 16, 2019, in corresponding Chinese application No. 201680026422.3.

* cited by examiner

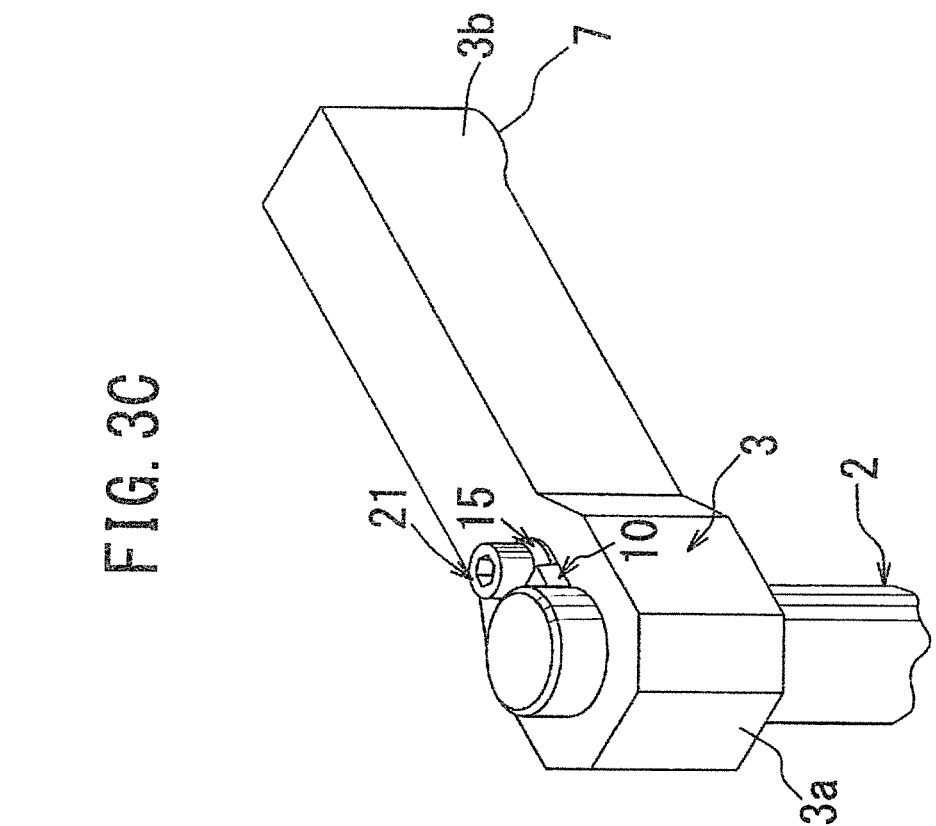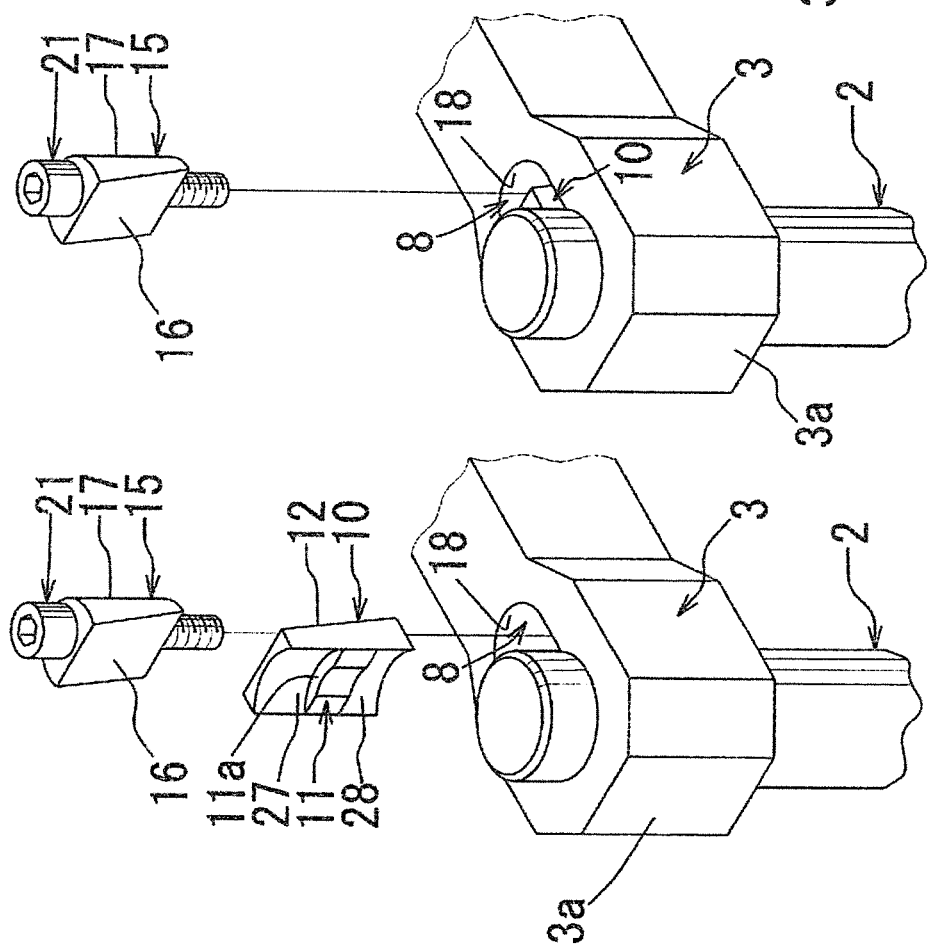

ATTACHMENT/DETACHMENT STRUCTURE FOR CLAMP ARM OF CLAMPING DEVICE

TECHNICAL FIELD

The present invention relates to a structure for attaching/detaching a clamp arm to/from a clamp rod of a clamping device.

BACKGROUND ART

Known examples of such a clamping device include a device described in Patent Literature 1 (Japanese Unexamined Patent Publication No. 2004-223640). The known art is structured as follows.

A clamp rod is rotatably inserted into a housing. A clamp arm is detachably attached to the clamp rod. The clamp rod has a tapered outer peripheral surface and an external thread portion which are provided in order from bottom to top at an upper end portion of the clamp rod. The tapered outer peripheral surface tapers narrower upward. The external thread portion is provided coaxially with the axis of the clamp rod. At a left end portion of the clamp arm, a tapered attachment hole is provided so as to taper narrower upward.

In order to attach the clamp arm to the clamp rod, first of all, the tapered attachment hole of the clamp arm is fitted over the tapered outer peripheral surface of the clamp rod. Then, the clamp arm is tightly held using a dedicated attachment jig (for example, a vise or the like) configured to prevent the rotation of the clamp arm. Subsequently, a nut is screwed over the external thread portion, and using its tightening force, the clamp arm is brought into strong wedge engagement with the clamp rod. Finally, the clamp arm is detached from the attachment jig.

In order to detach the clamp arm from the clamp rod, first of all, the nut is detached from the clamp rod. Then, a dedicated detachment jig is screwed into an upper portion of the tapered attachment hole of the clamp arm. Subsequently, a bolt is rotated and tightened into an upper portion of the detachment jig, and thereby the clamp arm is raised relative to the clamp rod. Finally, the detachment jig is detached from the clamp arm.

CITATION LIST

Patent Literature

Patent Literature 1: Japanese Unexamined Patent Publication No. 2004-223640

SUMMARY OF INVENTION

Technical Problem

In the above-described known art, the dedicated attachment jig is needed to attach the clamp arm to the clamp rod, and this makes the attachment work laborious.

Furthermore, in the above-described known art, the dedicated detachment jig is needed to detach the clamp arm from the clamp rod, and this makes the detachment work laborious.

An object of the present invention is to make the work for attaching the clamp arm to the clamp rod easier.

Another object of the present invention is to make the work for detaching the clamp arm from the clamp rod easier.

Solution to Problem

In order to achieve the above objects, in an aspect of the present invention, an attachment/detachment structure for a clamp arm of a clamping device is structured as follows.

A clamp rod 2 is inserted into a housing 1 so as to be movable between a leading end side and a base end side. The clamp rod 2 includes a recess 2a provided at a leading end portion of the clamp rod 2. A clamp arm 3 is detachably attached to the clamp rod 2. An attachment hole 6 is provided at a first end portion 3a of the clamp arm 3 so as to pass through the first end portion 3a between its leading end side and base end side. A pushing portion 7 provided at a second end portion 3b of the clamp arm 3 is configured to be brought into contact with an object to be clamped. An accommodation hole 8 provided adjacent to the attachment hole 6 so as to be closer to the second end portion 3b than the attachment hole 6 is open toward the leading end side. The transmission member 10 is configured to be inserted into the accommodation hole 8. A protrusion 11 which protrudes from a first-end-side portion of an outer periphery of the transmission member 10, the first-end-side portion being close to the first end portion 3a, is inserted into the recess 2a. A wedge member 15 configured to be inserted in the accommodation hole 8 is shaped so as to taper narrower toward the base end side. At a time of attaching the clamp arm 3 to the clamp rod 2, the wedge member 15 is pressed using a tightening bolt 21 toward the base end side, and thereby the wedge member 15 presses the attachment hole 6 via the transmission member 10 and the clamp rod 2, and presses the accommodation hole 8.

In the above aspect of the present invention, the following functions and effects are provided.

In the present invention, the wedge member is brought into wedge engagement with the transmission member, between a part of the outer periphery of the clamp rod and the accommodation hole of the clamp arm. Meanwhile, in the aforementioned known art, a tapered inner peripheral surface of the clamp arm is brought into wedge engagement with the entire tapered outer peripheral surface of the clamp rod.

In the present invention, due to the above-described structure, the wedge member presses only a part of the outer periphery of the clamp rod via the transmission member, and therefore the rotational torque of the tightening bolt pressing the wedge member is smaller than that of the known art. Due to this, a dedicated attachment jig to prevent the rotation of the clamp arm is not needed when the tightening bolt is rotated and tightened. This makes the work for attaching the clamp arm to the clamp rod easier.

It is preferable to incorporate the following features (1) to (3) into the above aspect of the present invention.

(1) A first pressing surface 16 provided on a first-end-side portion of the wedge member 15 is configured to be brought into wedge engagement, from the leading end side, with a first receiving surface 12 provided on the transmission member 10, the first-end-side portion being close to the first end portion 3a. Further, a second pressing surface 17 provided on a second-end-side portion of the wedge member 15 is configured to be brought into engagement with a second receiving surface 18 provided in the accommodation hole 8, the second-end-side portion being close to the second end portion 3b.

When the wedge member is brought into wedge engagement by the tightening bolt between the clamp rod and the clamp arm in this arrangement, the first pressing surface of the wedge member presses the attachment hole of the clamp arm via the first receiving surface of the transmission member and the clamp rod, and the second pressing surface of the wedge member presses the second receiving surface of the accommodation hole of the clamp rod. Due to this, the clamp arm is firmly fixed to the clamp rod.

(2) The recess 2a is formed by a groove provided in a circumferential direction at a leading end portion of the clamp rod 2.

In this case, in a temporarily assembled state in which the transmission member is inserted into the accommodation hole and the protrusion of the transmission member is inserted into the groove (recess) of the clamp rod, it is possible to rotate the clamp arm to a desired angular position about the axis of the clamp rod. This allows adjustment of the position of the clamp arm in the circumferential direction when attaching the clamp arm to the clamp rod.

(3) At least a part of the recess 2a of the clamp rod 2 is provided on the leading end side relative to a leading end surface 3c of the clamp arm 3, the leading end surface 3c being the surface on the leading end side.

In this case, the bending moment transmitted from the clamped object via the pushing portion, the clamp arm, the wedge member, and the transmission member is strongly received by a base-side portion of the clamp rod, which is provided on the base end side relative to the above recess. To be more specific, the diameter of the base-side portion of the clamp rod, which is on the base end side relative to the recess, is larger than that of its recessed portion where the recess is provided, and therefore, the strength of the base-side portion of the clamp rod is higher than that of the recessed portion. This enables the base-side portion to strongly receive the bending moment as compared with the recessed portion, and as a result, damage and/or deformation of the clamp rod is preventable.

It is preferable to incorporate the following feature into the above aspect of the present invention, in order to achieve the other object.

A bolt insertion hole 19 is provided through the wedge member 15, and the tightening bolt 21 inserted into the bolt insertion hole 19 is screwed into a bottom portion 8a of the accommodation hole 8. At a time of detaching the clamp arm 3 from the clamp rod 2, the tightening bolt 21 is rotated and loosened, and thereby an engaging portion 24 provided at a midway portion of the tightening bolt 21 presses a lock portion 20 provided in the bolt insertion hole 19 toward the leading end side.

In this case, as the tightening bolt is rotated and loosened, and thereby the screw driving force of the tightening bolt moves the engaging portion of the tightening bolt toward the leading end side, the engaging portion is brought into contact with the lock portion of the wedge member from the base end side. Then, the screw driving force strongly pushes and moves the wedge member toward the leading end side via the engaging portion and the lock portion, with the result that the wedge engagement of the wedge member is released. Accordingly, a dedicated detachment jig is not needed to detach the clamp arm from the clamp rod. This makes the work for detaching the clamp arm from the clamp rod easier.

Furthermore, it is preferable to incorporate the following feature into the above aspect of the present invention.

The transmission member 10 and the wedge member 15 are connected to each other by a connecting member 45 so as to be movable relatively to each other between the leading end side and the base end side.

In this case, the transmission member and the wedge member, which are smaller than the other elements such as the clamp rod, are connected to each other and are detachable together from the clamp rod. This makes the work for detachment less laborious.

BRIEF DESCRIPTION OF THE DRAWINGS

FIG. 3A to FIG. 3C are explanatory views illustrating the procedure for attaching the clamp arm to the clamp rod, and each is a diagram similar to FIG. 1.

DESCRIPTION OF EMBODIMENTS

FIG. 1 to FIG. 4 show First Embodiment of the present invention.

Figure 1:
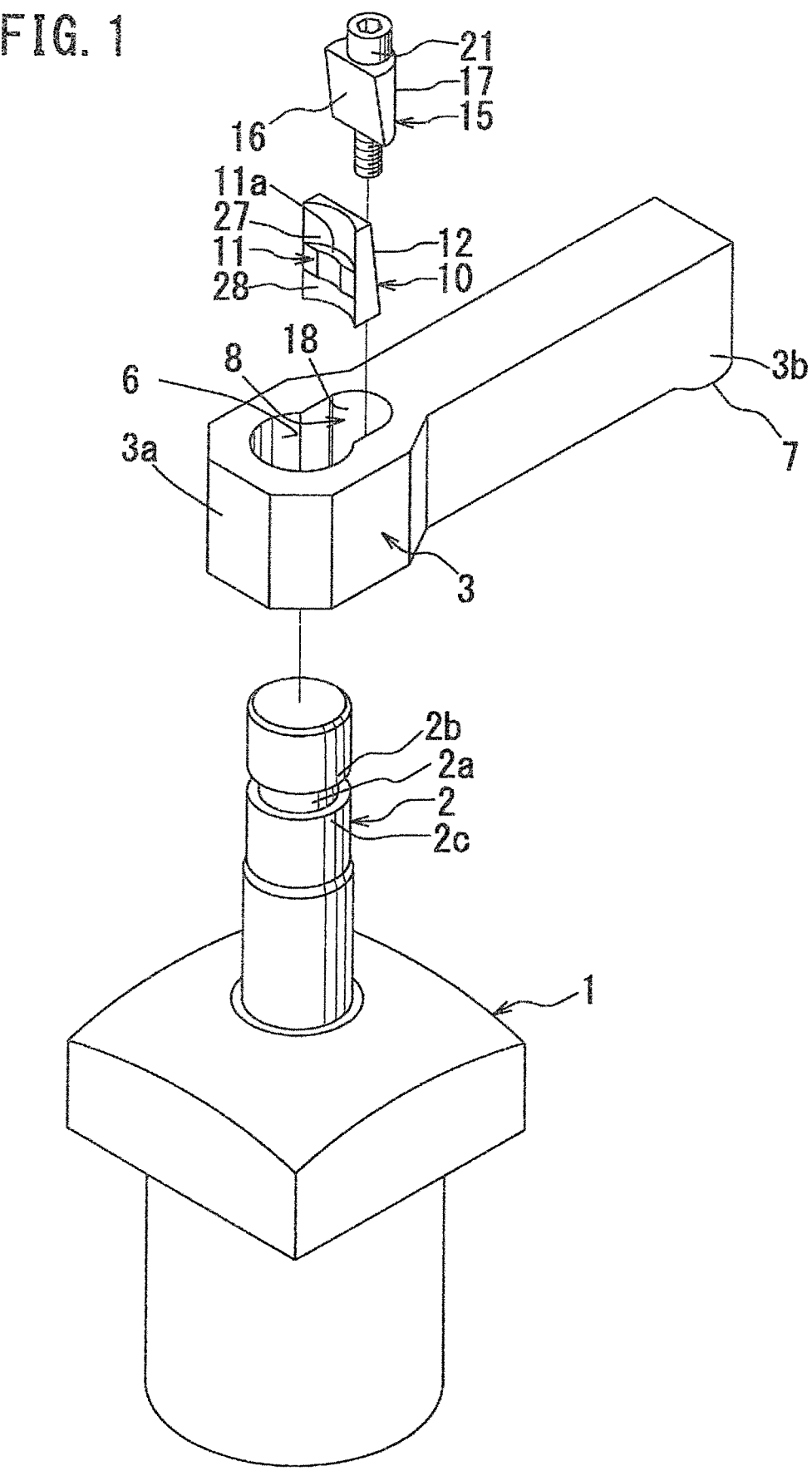
FIG. 1 shows First Embodiment of the present invention, and is a perspective view of a structure for attaching/detaching a clamp arm to/from a clamp rod of a clamping device.
Figure 2:
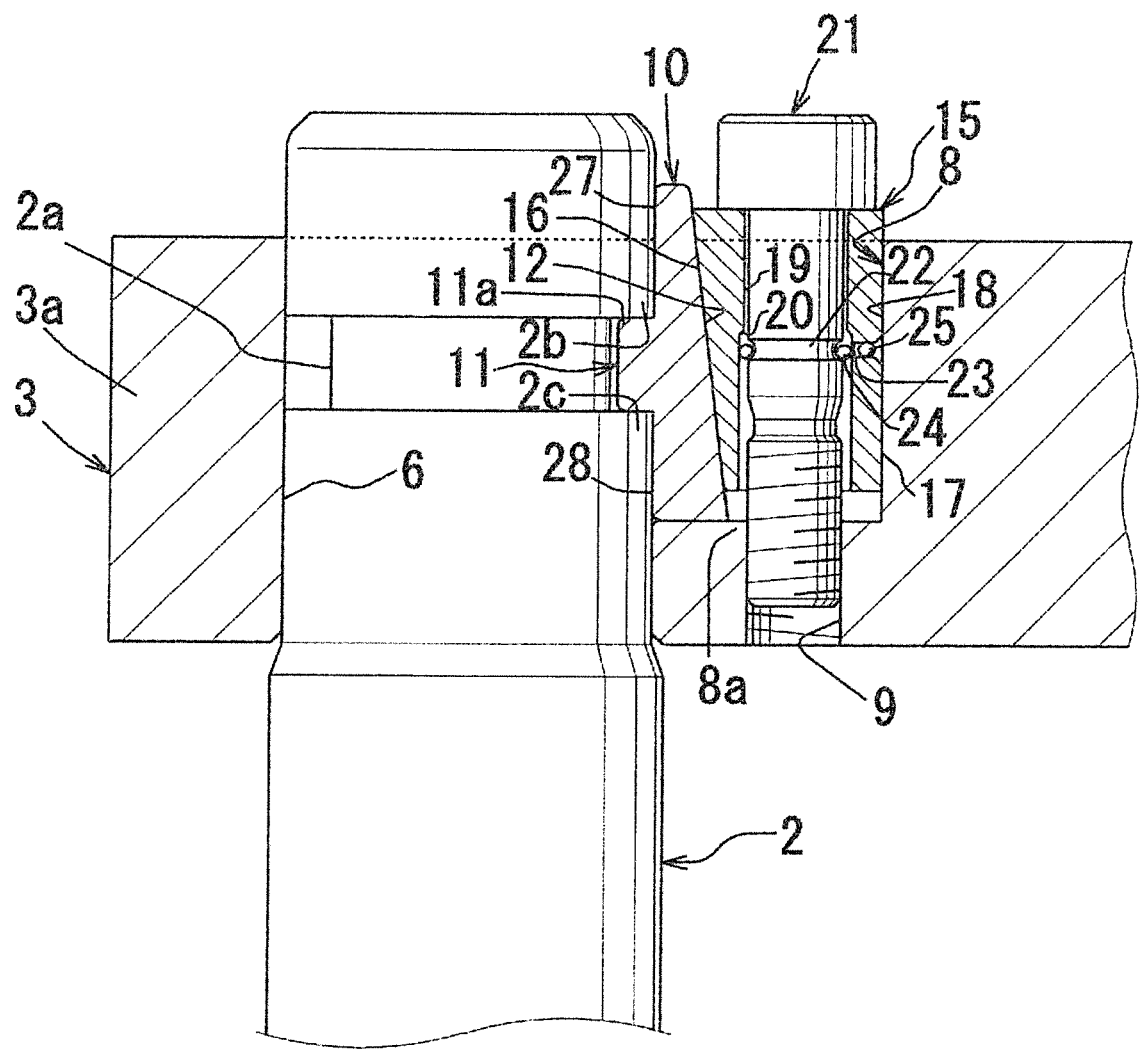
FIG. 2 is an elevational view in section, showing a state in which the clamp arm has been attached to the clamp rod.

As shown in FIG. 1 and FIG. 2, a clamp rod 2 is inserted into a housing 1 of a rotary clamping device so as to be movable in a vertical direction (i.e., between a leading end side and a base end side) and so as to be rotatable about an axis of the clamp rod 2. A clamp arm 3 is detachably attached to the clamp rod 2. The following describes an attachment/detachment structure for the clamp arm, with reference to FIG. 1 and FIG. 2.

At a leading end portion of the clamp rod 2, a groove (recess) 2a provided in a circumferential direction. An attachment hole 6 is provided at a left end portion (first end portion) 3a of the clamp arm 3 so as to pass through the left end portion in the vertical direction. A pushing portion 7 is provided at a right end portion (second end portion) 3b of the clamp arm 3, and the pushing portion 7 is configured to push a workpiece (not illustrated) downward, which functions as an object to be clamped. An accommodation hole 8 is provided adjacent to the attachment hole 6, at a position to the upper right of the attachment hole 6. The accommodation hole 8 is open upward (toward the leading end side). A bolt hole 9 is provided at a bottom portion 8a of the accommodation hole 8.

A transmission member 10 is inserted from above into a leftish portion of the accommodation hole 8. A lower end surface of the transmission member 10 is received by the bottom portion 8a of the accommodation hole 8. On a left wall (inner peripheral wall) of the transmission member 10, a first engagement surface 27 and a second engagement surface 28 are provided. Each of the engagement surfaces 27 and 28 is recessed toward the right in a plan view, and extends straight in the vertical direction. The first engagement surface 27 is brought into contact, from a lateral side, with an upper wall 2b provided above the groove 2a of the clamp rod 2. The second engagement surface 28 is brought into contact with an outer peripheral surface of a lower wall 2c provided below the groove 2a. A protrusion 11 having a semi-cylindrical shape in a plan view protrudes leftward from a midway portion of the left wall of the transmission member 10. The protrusion 11 is fitted into the groove 2a of the clamp rod 2 from the right. A first receiving surface 12 is provided on a right wall (outer peripheral wall) of the transmission member 10. The first receiving surface 12 has a flat plane shape and is provided such that the distance between the axis of the clamp rod 2 and the surface 12 increases downward.

A wedge member 15 is inserted from above into a rightish portion of the accommodation hole 8. A predetermined gap is formed between a lower end portion of the wedge member 15 and the bottom portion 8a of the accommodation hole 8. The wedge member 15 has a semi-circular shape in a plan view. A first pressing surface 16 having a flat plane shape is provided on a left portion (inner peripheral portion) of the wedge member 15 so that the distance between the axis of the clamp rod 2 and the surface 16 increases downward. The first pressing surface 16 is configured to be brought into wedge engagement with the first receiving surface 12 of the transmission member 10 from above. A second pressing surface 17 is provided at a right portion (outer peripheral portion) of the wedge member 15 so that the surface 17 extends straight in the vertical direction. The second pressing surface 17 is brought into engagement with a second receiving surface 18 provided in the accommodation hole 8 of the clamp arm 3.

A bolt insertion hole 19 passes through the wedge member 15 in the vertical direction. A lock portion 20 is provided at a midway portion of the bolt insertion hole 19. A tightening bolt 21 is inserted into the bolt insertion hole 19, and a groove 22 is provided in the circumferential direction at a midway portion of the tightening bolt 21. An annular space is formed between the groove 22 and the bolt insertion hole 19. An insertion hole 23 is provided through the right portion (outer peripheral portion) of the wedge member 15 to communicate with the bolt insertion hole 19, so as to be substantially level with the groove 22. Through the above insertion hole 23, a plurality of engagement balls (engaging portions) 24 are inserted into the annular space. The engagement balls 24 are opposed to the lock portion 20 from below with a predetermined gap between the balls 24 and the lock portion 20. The above insertion hole 23 is closed by a large-diameter ball 25 after the engagement balls 24 are inserted.

Before the clamp arm 3 is attached to the clamp rod 2, the tightening bolt 21 is inserted into the wedge member 15, and the engagement balls 24 are inserted into the groove 22 of the tightening bolt 21. In this temporarily assembled state, the wedge member 15 is inserted into the accommodation hole 8.

The above-described clamp arm 3 is attached to the clamp rod 2 through the following procedure (see FIG. 1 to FIG. 3C).

First of all, the attachment hole 6 of the clamp arm 3 is positioned above the clamp rod 2, as shown in FIG. 1. Then, the clamp arm 3 is lowered. As a result, the attachment hole 6 of the clamp arm 3 is fitted over the clamp rod 2, as shown in FIG. 3A.

Subsequently, as shown in FIG. 3B (and FIG. 2), the transmission member 10 is inserted, from above, into the accommodation hole 8 of the clamp arm 3, and the protrusion 11 of the transmission member 10 is inserted into the groove 2a of the clamp rod 2 from the right.

Furthermore, as shown in FIG. 3C (and FIG. 2), the wedge member 15 in the temporarily assembled state is inserted into the accommodation hole 8 from above. At this time, the first pressing surface 16 of the wedge member 15 is brought into wedge engagement with the first receiving surface 12 of the transmission member 10 from above, and the second pressing surface 17 of the wedge member 15 is brought into engagement with the second receiving surface 18 of the accommodation hole 8.

Thereafter, the tightening bolt 21 inserted in the bolt insertion hole 19 of the wedge member 15 is rotated and tightened into the bolt hole 9 of the clamp arm 3. As a result, the tightening bolt 21 presses the wedge member 15 downward, and the wedge member 15 presses the clamp rod 2 to the attachment hole 6 of the clamp arm 3 via the first pressing surface 16 and the first receiving surface 12 of the transmission member 10. Due to this, a reaction force from the attachment hole 6 is exerted onto the wedge member 15 via the clamp rod 2 and the transmission member 10, and the second pressing surface 17 of the wedge member 15 presses the second receiving surface 18 of the accommodation hole 8 of the clamp arm 3. Consequently, the clamp arm 3 is firmly fixed to the clamp rod 2.

When the clamp rod 2 to which the clamp arm 3 has been attached is driven downward for locking, the pushing portion 7 of the clamp arm 3 presses an object to be clamped (not illustrated) downward. To be more specific, a force lowering the clamp rod 2 is transmitted to the transmission member 10 via the upper wall 2b provided above the groove 2a of the clamp rod 2 and via an upper wall 11a of the protrusion 11. The transmitted force is further transmitted from the lower end portion of the transmission member 10 to the clamp arm 3 via the bottom portion 8a of the accommodation hole 8 of the clamp arm 3. With this, the pushing portion 7 of the clamp arm 3 presses the object to be clamped (not illustrated) downward. As a consequence, the force lowering the clamp rod 2 is reliably transmitted to the object to be clamped via the transmission member 10 and the clamp arm 3.

In the state in which the object is locked, the reaction force acting from the object to the pushing portion 7 of the clamp arm 3 is received by the clamp rod 2 via the bottom portion 8a, the upper wall 11a of the protrusion 11 of the transmission member 10, and the upper wall 2b of the groove 2a.

Furthermore, in the above state in which the object is locked, the reaction force acting from the object to the clamp arm 3 applies a counterclockwise moment to an upper portion of the clamp rod 2 via the clamp arm 3. The counterclockwise moment is mainly received by parts of the outer peripheral surface of the clamp rod 2 which are on the upper and lower sides of the groove 2a of the clamp rod 2.

The above-described clamp arm 3 is detached from the clamp rod 2 through the following procedure.

Figure 4:
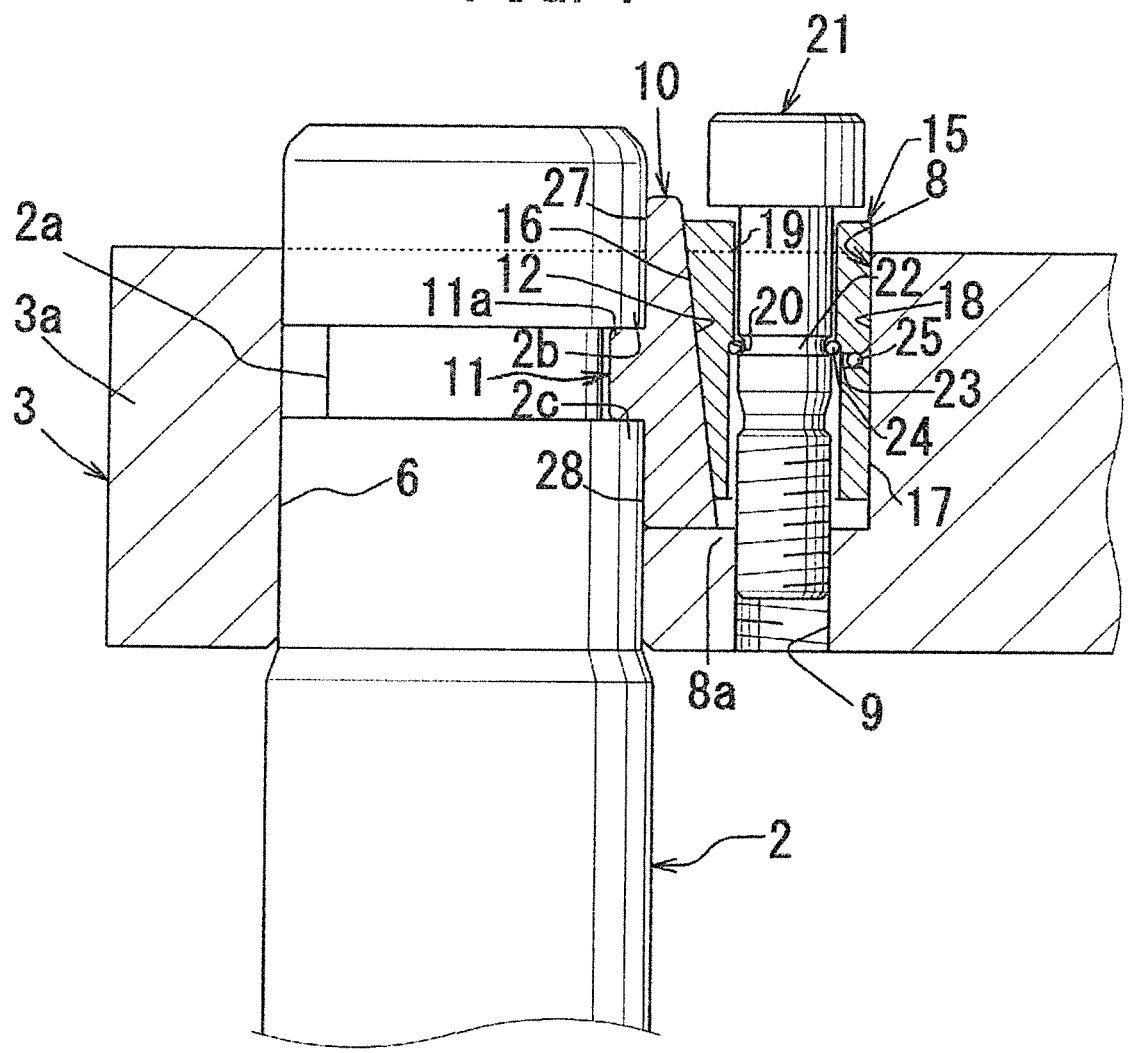
FIG. 4 shows an early stage of the process of detaching the clamp arm from the clamp rod, and is a diagram similar to FIG. 2.

First of all, when the tightening bolt 21 is rotated and loosened in the state of FIG. 2, in which the clamp arm 3 has been attached, the screw driving force of the tightening bolt 21 raises the engagement balls 24 via the groove 22 of the tightening bolt 21. As a result, the engagement balls 24 are brought into contact with the lock portion 20 of the wedge member 15, as shown in FIG. 4. Subsequently, the screw driving force strongly pushes the wedge member 15 upward via the engagement balls 24 and the lock portion 20, with the result that the wedge engagement of the wedge member 15 is released. Then, the wedge member 15 is taken upward out of the accommodation hole 8. Subsequently, the protrusion 11 of the transmission member 10 is taken rightward out of the groove 2a of the clamp rod 2. Then, the transmission member 10 is taken upward out of the accommodation hole 8. Finally, the clamp arm 3 is detached from the clamp rod 2.

The first pressing surface 16 is inclined with respect to the axis of the clamp rod 2 at a predetermined angle. The inclination angle is preferably in the range from 2.5 degrees to 15 degrees, and more preferably in the range from 4 degrees to 12 degrees. In this embodiment, the inclination angle of the first pressing surface 16 is 8 degrees.

First Embodiment described above has the following advantages.

In First Embodiment, at the time of attaching the clamp arm 3 to the clamp rod 2, the wedge member 15 is brought into wedge engagement with the transmission member 10, between a part of the outer periphery of the clamp rod 2 and the second receiving surface 18 of the accommodation hole 8 of the clamp arm 3. Meanwhile, in the aforementioned known art, the tapered inner peripheral surface of the clamp arm is brought into wedge engagement with the entire tapered outer peripheral surface of the clamp rod.

In First Embodiment described above, when the clamp arm 3 is attached, the wedge member 15 presses only parts of the outer periphery of the clamp rod 2, which are respectively in contact with the first engagement surface 27 and the second engagement surface 28, via the transmission member 10. Therefore, the force pushing the wedge member 15 is smaller, and thus the rotational torque of the tightening bolt 21 is smaller, than that of the known art. Due to this, a dedicated attachment jig to prevent the rotation of the clamp arm 3 is not needed when the tightening bolt 21 is rotated and tightened. This makes the work for attaching the clamp arm 3 to the clamp rod 2 easier.

Furthermore, in First Embodiment described above, at the time of detaching the clamp arm 3 from the clamp rod 2, the tightening bolt 21 is rotated and loosened, and thereby the screw driving force of the tightening bolt 21 raises the engagement balls 24. As a result, the engagement balls 24 are brought into contact with the lock portion 20 of the wedge member 15 from below. Then, the screw driving force strongly pushes and moves the wedge member 15 upward via the engagement balls 24 and the lock portion 20, with the result that the wedge engagement of the wedge member 15 is released.

Accordingly, a dedicated detachment jig is not needed to detach the clamp arm 3 from the clamp rod 2. This makes the work for detaching the clamp arm 3 from the clamp rod 2 easier.

FIG. 5 to FIG. 16 show Second Embodiment to Ninth Embodiment (including modifications) of the present invention. In Second to Ninth Embodiments (including modifications), the components the same as or similar to the components in First Embodiment are given the same reference numerals, in principle.

Figure 5:
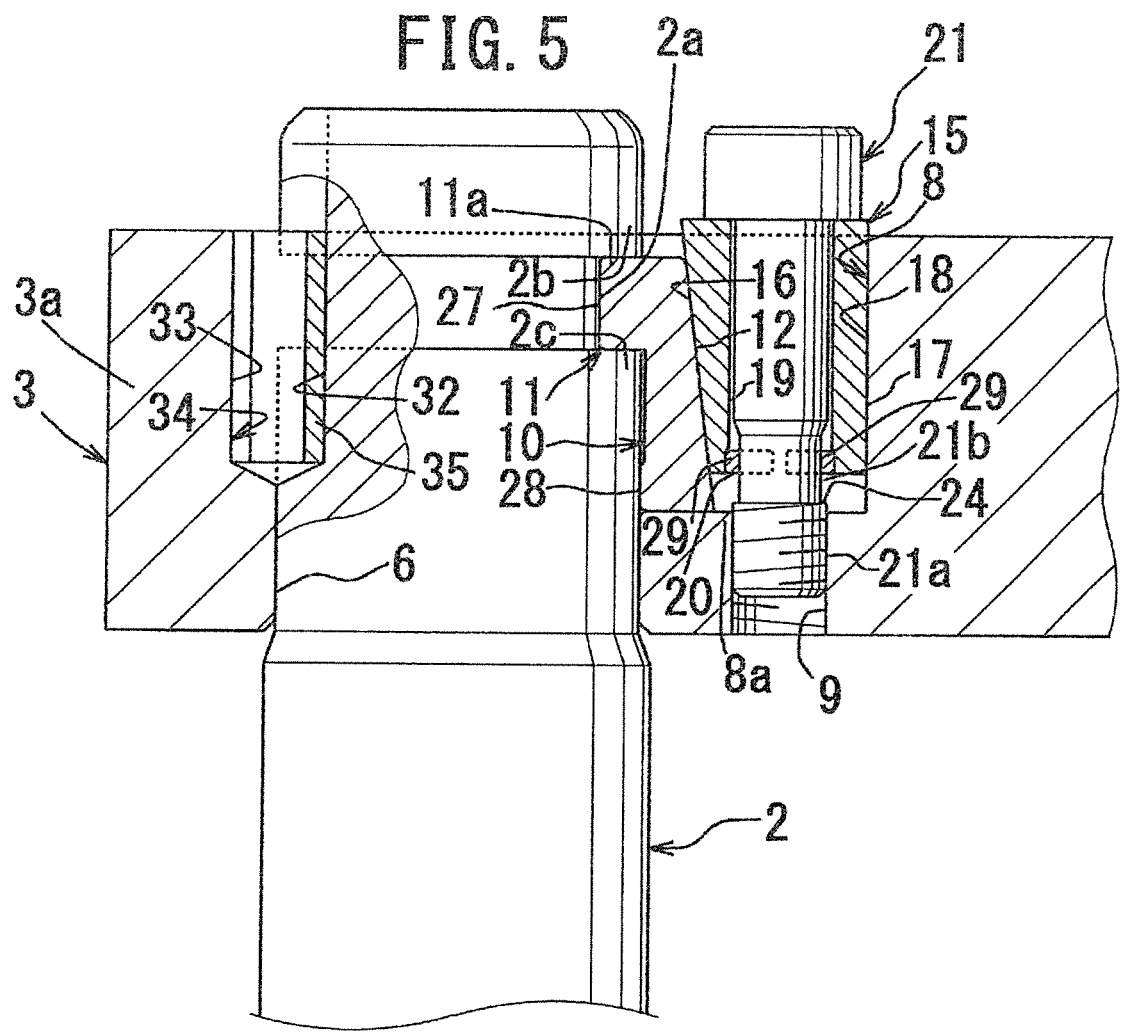
FIG. 5 shows Second Embodiment of the present invention, and is a diagram similar to FIG. 2.

Second Embodiment shown in FIG. 5 is different from First Embodiment in the following points.

The protrusion 11 protrudes leftward from an upper portion of the left wall (inner peripheral wall) of the transmission member 10. The first engagement surface 27 is provided on a left wall of the protrusion 11, and the first engagement surface 27 is brought into contact, from a lateral side, with a bottom wall of the groove 2a of the clamp rod 2. The second engagement surface 28 is provided on a lower portion of the left wall of the transmission member 10, and the second engagement surface 28 is brought into contact, from the lateral side, with the lower wall 2c of the clamp rod 2.

Lock members 29, 29 are inserted from below into a lower end portion of the bolt insertion hole 19 of the wedge member 15 and fixed. The lock members 29, 29 are arc-shaped halves of a member having an annular shape in a plan view.

The under surfaces of the lock members 29 serve as the lock portion 20. The tightening bolt 21 configured to be inserted into the bolt insertion hole 19 includes: an external thread portion 21a; and a small diameter portion 21b provided above the external thread portion 21a. An engaging portion 24 is provided at a level-difference portion between the external thread portion 21a and the small diameter portion 21b. A predetermined gap is formed between the engaging portion 24 and the lock portion 20.

Before the clamp arm 3 is attached to the clamp rod 2, the tightening bolt 21 is inserted into the wedge member 15, and the lock members 29, 29 are inserted into the bolt insertion hole 19. In this temporarily assembled state, the wedge member 15 is inserted into the accommodation hole 8.

A first attachment groove 32 is provided to extend downward from an upper end surface of the clamp rod 2. A second attachment groove 33 is provided to extend in the vertical direction at a left portion of the peripheral wall of the attachment hole 6 of the clamp arm 3. A pin receiving hole 34 is provided between the first attachment groove 32 and the second attachment groove 33. A rotation-prevention pin 35 is inserted into the pin receiving hole 34, and this prevents the rotation of the clamp arm 3 with respect to the clamp rod 2 in the circumferential direction. As the rotation-prevention pin 35, a spring pin or a parallel pin may be used for example, as illustrated by way of example.

The above-described clamp arm 3 is attached to the clamp rod 2 through the following procedure.

First of all, the clamp arm 3 is lowered from a position above the clamp rod 2, so that the attachment hole 6 of the clamp arm 3 is fitted over the clamp rod 2. Then, the clamp arm 3 is rotated about the axis of the clamp rod 2, to cause the first attachment groove 32 of the clamp rod 2 to face the second attachment groove 33 of the clamp arm 3. The pin 35 is inserted, from above, into the pin receiving hole 34 provided between the first attachment groove 32 and the second attachment groove 33. Subsequently, the transmission member 10 is inserted, from above, into the accommodation hole 8 of the clamp arm 3, and the protrusion 11 of the transmission member 10 is inserted into the groove 2a of the clamp rod 2 from the right. Furthermore, the wedge member 15 in the above temporarily assembled state is inserted into the accommodation hole 8 from above. At this time, the first pressing surface 16 of the wedge member 15 is brought into wedge engagement with the first receiving surface 12 of the transmission member 10 from above, and the second pressing surface 17 of the wedge member 15 is brought into engagement with the second receiving surface 18 of the accommodation hole 8. Thereafter, the tightening bolt 21 inserted in the bolt insertion hole 19 of the wedge member 15 is rotated and tightened into the bolt hole 9. As a result, the tightening bolt 21 presses the wedge member 15 downward, and the wedge member 15 presses the clamp rod 2 to the attachment hole 6 of the clamp arm 3 via the first pressing surface 16 and the first receiving surface 12 of the transmission member 10. Due to this, a reaction force from the attachment hole 6 is exerted onto the wedge member 15 via the clamp rod 2 and the transmission member 10, and the second pressing surface 17 of the wedge member 15 presses the second receiving surface 18 of the accommodation hole 8 of the clamp arm 3. Consequently, the clamp arm 3 is firmly fixed to the clamp rod 2.

When the clamp rod 2 to which the clamp arm 3 has been attached is driven downward for locking, the pushing portion 7 of the clamp arm 3 presses an object to be clamped (not illustrated) downward. To be more specific, a force lowering the clamp rod 2 is transmitted to the transmission member 10 via the upper wall 2b provided above the groove 2a of the clamp rod 2 and via the upper wall 11a of the protrusion 11. The transmitted force is further transmitted from the lower end portion of the transmission member 10 to the clamp arm 3 via the bottom portion 8a of the accommodation hole 8 of the clamp arm 3. With this, the pushing portion 7 of the clamp arm 3 presses the object to be clamped (not illustrated) downward. As a consequence, the force lowering the clamp rod 2 is reliably transmitted to the object to be clamped via the transmission member 10 and the clamp arm 3.

In the state in which the object is locked, the reaction force acting from the object to the pushing portion 7 of the clamp arm 3 is received by the clamp rod 2 via the bottom portion 8a, the upper wall 11a of the protrusion 11 of the transmission member 10, and the upper wall 2b of the groove 2a.

Furthermore, in the above state in which the object is locked, the reaction force acting from the object to the clamp arm 3 applies a counterclockwise moment to an upper portion of the clamp rod 2 via the clamp arm 3. The counterclockwise moment is mainly received by parts of the outer peripheral surface of the clamp rod 2 which are on the upper and lower sides of the groove 2a of the clamp rod 2.

The above-described clamp arm 3 is detached from the clamp rod 2 through the following procedure.

First of all, when the tightening bolt 21 is rotated and loosened in the state of FIG. 5, the engaging portion 24 of the tightening bolt 21 is raised. As a result, the engaging portion 24 is brought into contact with the lock portion 20 of the wedge member 15 from below. Subsequently, the screw driving force strongly pushes the wedge member 15 via the engaging portion 24 of the tightening bolt 21 and the lock portion 20, with the result that the wedge engagement of the wedge member 15 is released. Thereafter, the wedge member 15 is taken upward out of the accommodation hole 8. Subsequently, the protrusion 11 of the transmission member 10 is taken rightward out of the groove 2a of the clamp rod 2. Thereafter, the transmission member 10 is taken upward out of the accommodation hole 8. Finally, the clamp arm 3 is detached from the clamp rod 2.

Second Embodiment described above has the following advantages.

In Second Embodiment, at the time of attaching the clamp arm 3 to the clamp rod 2, the wedge member 15 is brought into wedge engagement with the transmission member 10, between a part of the outer periphery of the clamp rod 2 and the second receiving surface 18 of the accommodation hole 8 of the clamp arm 3. Meanwhile, in the known art, the tapered inner peripheral surface of the clamp arm is brought into wedge engagement with the entire tapered outer peripheral surface of the clamp rod.

In Second Embodiment described above, when the clamp arm 3 is attached, the wedge member 15 presses only parts of the outer periphery of the clamp rod 2, which are respectively in contact with the first engagement surface 27 and the second engagement surface 28, via the transmission member 10. Therefore, the force pushing the wedge member 15 is smaller, and thus the rotational torque of the tightening bolt 21 is smaller, than that of the known art. Due to this, a dedicated jig to prevent the rotation of the clamp arm 3 is not needed when the tightening bolt 21 is rotated and tightened. This makes the work for attaching the clamp arm 3 to the clamp rod 2 easier.

Furthermore, in Second Embodiment described above, at the time of detaching the clamp arm 3 from the clamp rod 2, the tightening bolt 21 is rotated and loosened, and thereby the engaging portion 24 of the tightening bolt 21 is moved upward. As a result, the engagement portion 24 is brought into contact with the lock portion 20 of the wedge member 15 from below. Then, the screw driving force strongly pushes and moves the wedge member 15 upward via the engaging portion 24 and the lock portion 20, with the result that the wedge engagement of the wedge member 15 is released.

Accordingly, a dedicated detachment jig is not needed to detach the clamp arm 3 from the clamp rod 2. This makes the work for detaching the clamp arm 3 from the clamp rod 2 easier.

Figure 6:
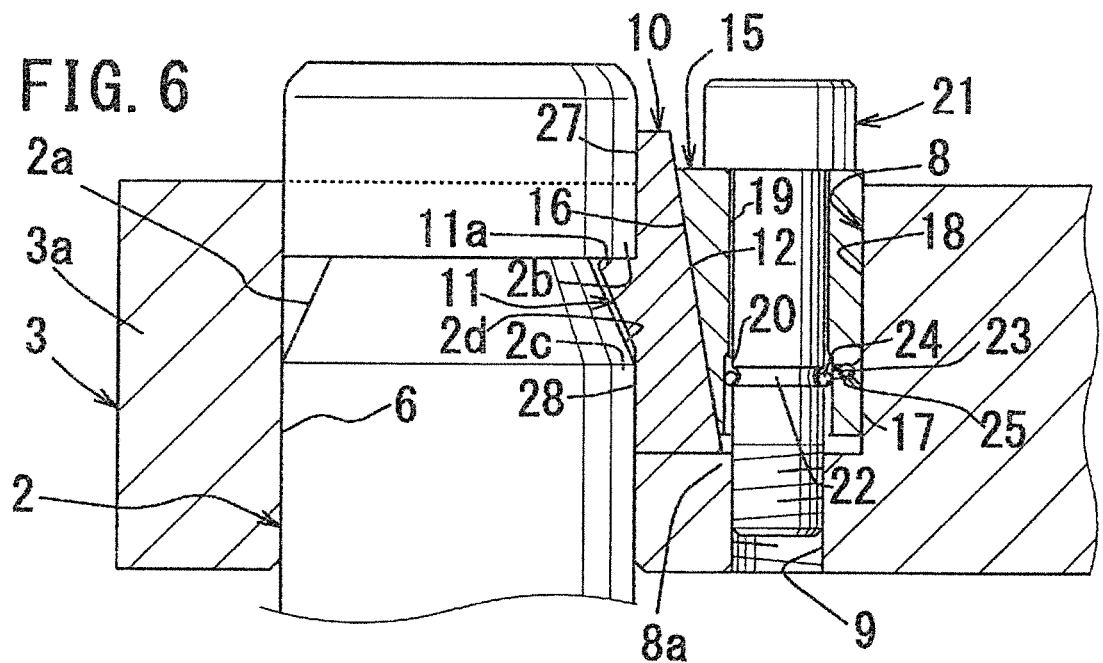
FIG. 6 shows Third Embodiment of the present invention, and is a diagram similar to FIG. 2.

Third Embodiment shown in FIG. 6 is different from First Embodiment in the following points.

The bottom wall of the groove 2a provided at an upper portion of the clamp rod 2 has a tapered surface 2d shaped so that the distance between the axis of the clamp rod 2 and the tapered surface 2d decreases upward. Furthermore, the protrusion 11 protrudes leftward from a midway portion of the left wall (inner peripheral wall) of the transmission member 10. A left wall surface of the protrusion 11 is inclined so that the distance between the axis of the clamp rod 2 and the left wall surface decreases upward. The upper wall 11a of the protrusion 11 is brought into contact with the upper wall 2b of the groove 2a from below. The first engagement surface 27 is provided on an upper portion of the left wall of the transmission member 10, and the first engagement surface 27 is brought into contact, from a lateral side, with the upper wall 2b of the clamp rod 2. The second engagement surface 28 is provided on a lower portion of the left wall of the transmission member 10, and the second engagement surface 28 is brought into contact, from the lateral side, with the lower wall 2c of the clamp rod 2.

In this embodiment, a groove-forming part of the clamp rod 2, which forms the groove 2a, is tapered so that its diameter increases downward. Due to this, the diameter of the tapered groove-forming part of the clamp rod 2 is larger than the diameter of the vertically straight groove-forming part of the clamp rod 2 of First Embodiment. Because of this, the strength of the clamp rod 2 of this embodiment is higher than that of the clamp rod 2 of First Embodiment. This enables the clamp rod of this embodiment to strongly receive the counterclockwise moment from a clamped object in the lock state.

Figure 7:
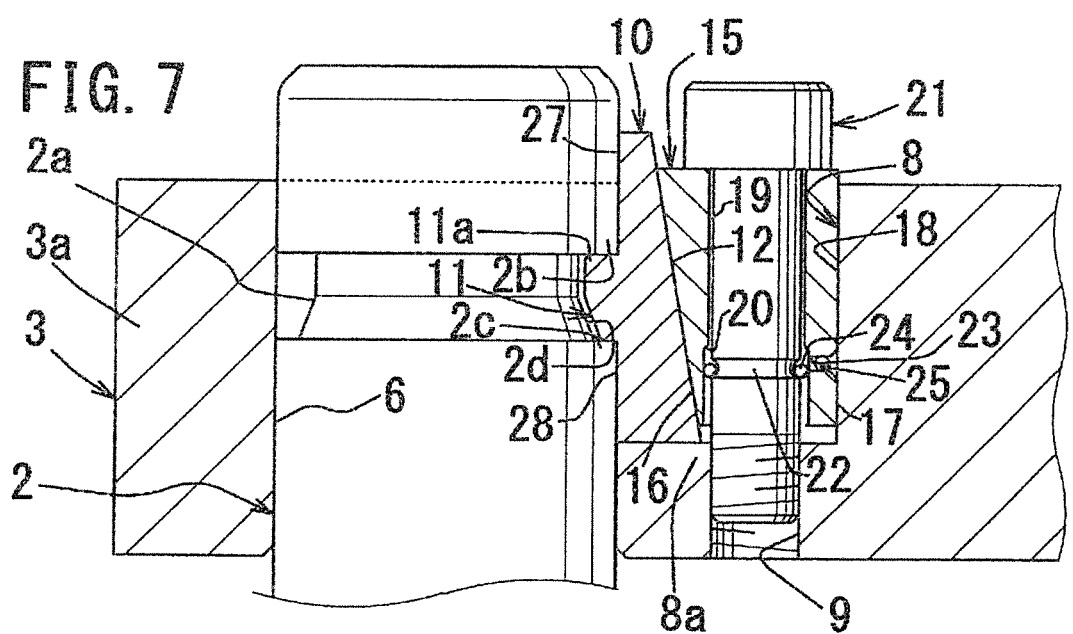
FIG. 7 shows Fourth Embodiment of the present invention, and is a diagram similar to FIG. 2.

Fourth Embodiment shown in FIG. 7 is different from First Embodiment in the following points.

On the bottom wall of the groove 2a provided at the upper portion of the clamp rod 2, the tapered surface 2a and a straight wall surface are provided. The tapered surface 2d is shaped so that the distance between the axis of the clamp rod 2 and the tapered surface 2d decreases upward. The straight wall surface is provided above the tapered surface 2d so as to extend straight in the vertical direction. Furthermore, the protrusion 11 protrudes leftward from a midway portion of the left wall (inner peripheral wall) of the transmission member 10. A left wall surface of the protrusion 11 has: an inclined surface inclined so that the distance between the axis of the clamp rod 2 and the inclined surface decreases upward; and a straight wall surface provided above the inclined surface so as to extend straight in the vertical direction. The upper wall 11a of the protrusion 11 is brought into contact with the upper wall 2b of the groove 2a from below.

In this embodiment, because the groove 2a of the clamp rod 2 has the tapered surface 2d, the part of the clamp rod 2, which corresponds to the tapered surface 2d, is shaped so that its diameter increases downward. Due to this, the diameter of the tapered part of the clamp rod 2 is larger than the diameter of the vertically straight groove-forming part of the clamp rod 2 of First Embodiment. Because of this, the strength of the clamp rod 2 of this embodiment is higher than that of the clamp rod 2 of First Embodiment. This enables the clamp rod of this embodiment to strongly receive the counterclockwise moment from a clamped object in the lock state.

Furthermore, the protrusion 11 is fitted into the groove 2a while being guided by the upper wall 2b and the lower wall 2c of the groove 2a. This enables the transmission member 10 to be attached to the clamp rod 2 with high positional precision with respect to the vertical direction.

Figure 8:
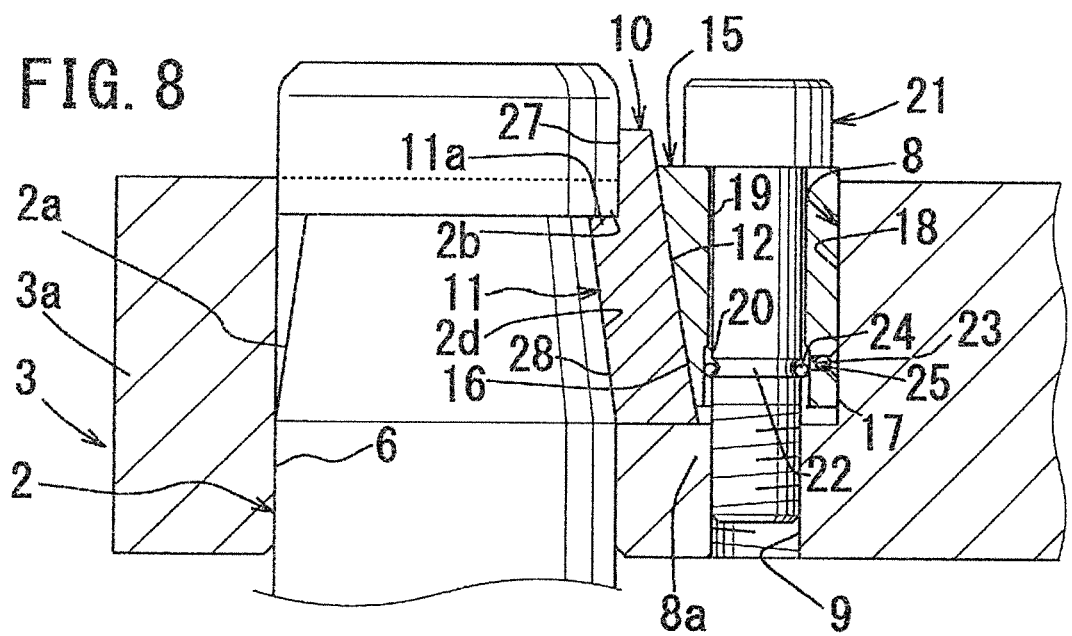
FIG. 8 shows Fifth Embodiment of the present invention, and is a diagram similar to FIG. 2.

Fifth Embodiment shown in FIG. 8 is different from First Embodiment in the following points.

The groove (recess) 2a provided at an upper portion of the clamp rod 2 has the tapered surface 2d shaped so that the distance between the axis of the clamp rod 2 and the tapered surface 2d decreases upward. Furthermore, the protrusion 11 protrudes leftward from the left wall (inner peripheral wall) of the transmission member 10. The left wall surface of the protrusion 11 is inclined so that the distance between the axis of the clamp rod 2 and the left wall surface decreases upward. The upper wall 11a of the protrusion 11 is brought into contact with the upper wall 2b of the groove 2a from below.

In this embodiment, because the groove 2a of the clamp rod 2 has the tapered surface 2d, and the clamp rod 2 at this part is shaped so that the diameter of the clamp rod 2 increases downward. Due to this, the diameter of the groove-forming part of the clamp rod 2, which forms the tapered groove 2a, is larger than the diameter of the vertically straight groove-forming part of the clamp rod 2 of First Embodiment. Because of this, the strength of the clamp rod 2 of this embodiment is higher than that of the clamp rod 2 of First Embodiment. This enables the clamp rod of this embodiment to strongly receive the counterclockwise moment from a clamped object in the lock state.

Figure 9:
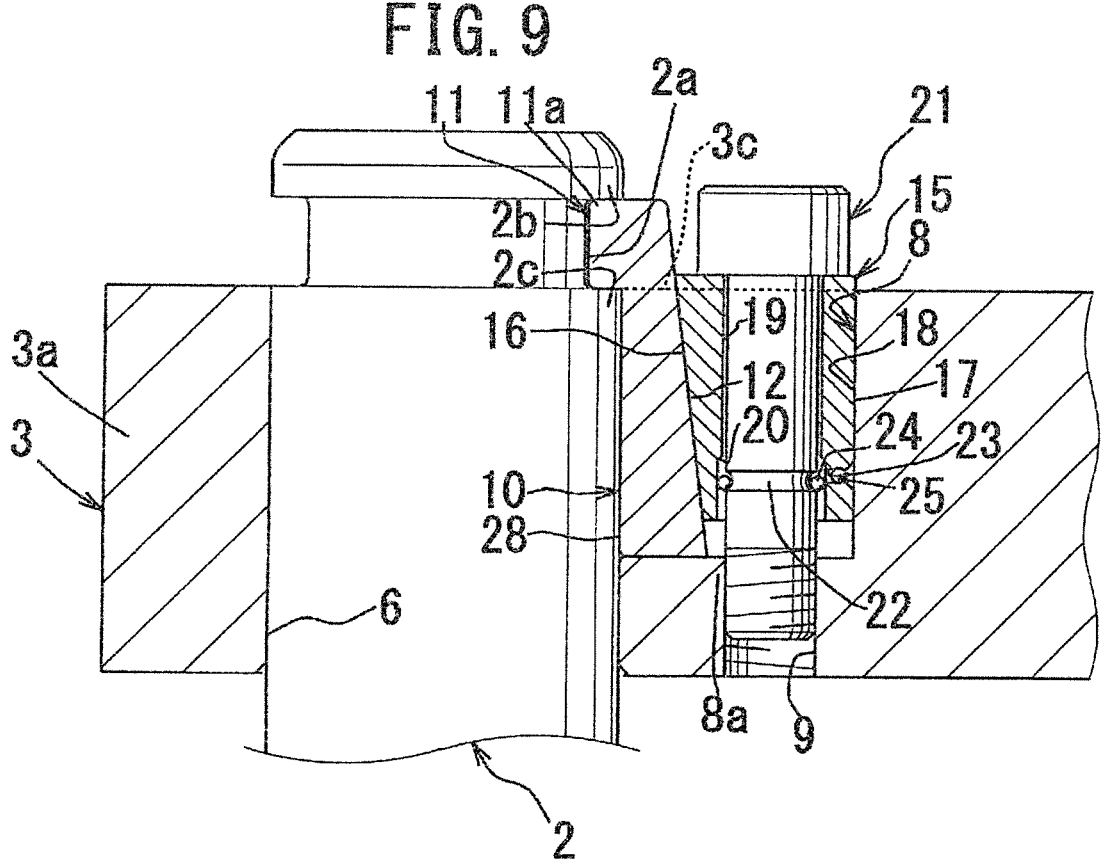
FIG. 9 shows Sixth Embodiment of the present invention, and is a diagram similar to FIG. 2.

Sixth Embodiment shown in FIG. 9 is different from First Embodiment in the following points.

The recess 2a of the clamp rod 2 is provided above, i.e., on the upper side (leading end side) relative to, an upper end surface (leading end surface) 3c of the clamp arm 3. The recess 2a is provided in the circumferential direction of the clamp rod 2 so as to have a shape of groove.

Furthermore, the protrusion 11 protrudes leftward from an upper portion of the left wall (inner peripheral wall) of the transmission member 10. The upper wall 11a of the protrusion 11 is brought into contact with the upper wall 2b of the recess 2a from below. An engagement surface 28 is provided at a lower portion of the left wall of the transmission member 10, and the engagement surface 28 is brought into contact, from a lateral side, with the lower wall 2c of the clamp rod 2.

In this embodiment, the diameter of a lower portion of the clamp rod 2, which is below the recess 2a, is larger than the diameter of its upper portion forming the recess 2a. Therefore, the strength of the lower portion of the clamp rod 2 is higher than that of the upper portion forming the recess 2a. This enables the lower portion to strongly receive the bending moment mentioned above as compared with the upper portion forming the recess 2a, and as a result, damage and/or deformation of the clamp rod 2 is preventable.

Figure 10:
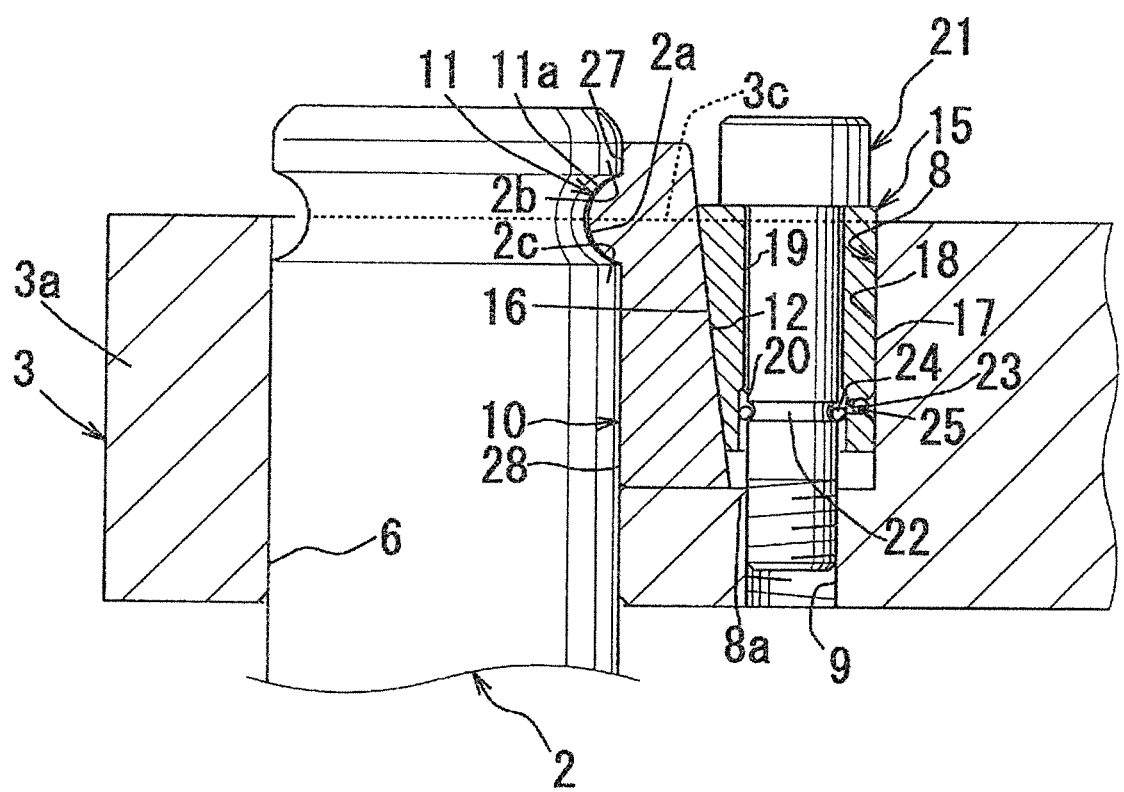
FIG. 10 shows Seventh Embodiment of the present invention, and is a diagram similar to FIG. 2.

Seventh Embodiment shown in FIG. 10 is different from First Embodiment in the following points.

An upper half portion of the recess 2a, which is at least a part of the recess 2a, is provided above the upper end surface 3c of the clamp arm 3. The recess 2a is provided in the circumferential direction of the clamp rod 2 so as to have a shape of groove. The recess 2a has an arc-shape cross-section.

Furthermore, the protrusion 11 protrudes leftward from a midway portion of the left wall (inner peripheral wall) of the transmission member 10. The protrusion 11 has an arc-shape cross-section. The first engagement surface 27 is provided on an upper portion of the left wall of the transmission member 10, and the first engagement surface 27 is brought into contact, from a lateral side, with the upper wall 2b of the clamp rod 2. Furthermore, the second engagement surface 28 is provided on a lower portion of the left wall of the transmission member 10, and the second engagement surface 28 is brought into contact, from the lateral side, with the lower wall 2c of the clamp rod 2.

Figure 11:
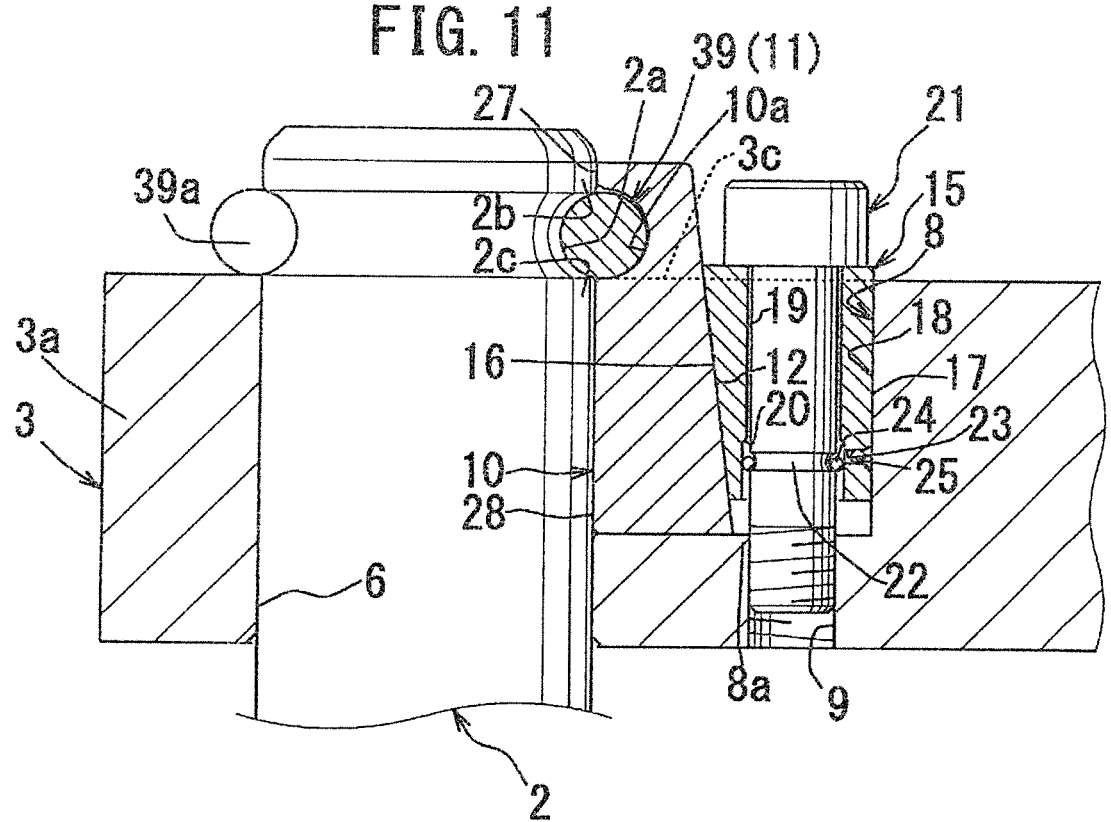
FIG. 11 shows Eighth Embodiment of the present invention, and is a diagram similar to FIG. 2.

Eighth Embodiment shown in FIG. 11 is different from First Embodiment in the following points.

The entirety of the recess 2a is provided above the upper end surface 3c of the clamp arm 3. The recess 2a is provided in the circumferential direction of the clamp rod 2 so as to have a shape of groove. The recess 2a has an arc-shape cross-section.

Furthermore, the protrusion 11 of the transmission member 10 is formed by an engagement ring 39. The engagement ring 39 has a slit 39a extending in the vertical direction, and is attached to the recess 2a.

Furthermore, a groove 10a is provided at an upper portion of the left wall (inner peripheral wall) of the transmission member 10. The groove 10a is fitted over an outer peripheral portion of the engagement ring 39.

The first engagement surface 27 is provided on the upper portion of the left wall of the transmission member 10, and the first engagement surface 27 is brought into contact, from a lateral side, with the upper wall 2b of the clamp rod 2. Furthermore, the second engagement surface 28 is provided on a lower portion of the left wall of the transmission member 10, and the second engagement surface 28 is brought into contact, from the lateral side, with the lower wall 2c of the clamp rod 2.

Figure 12:
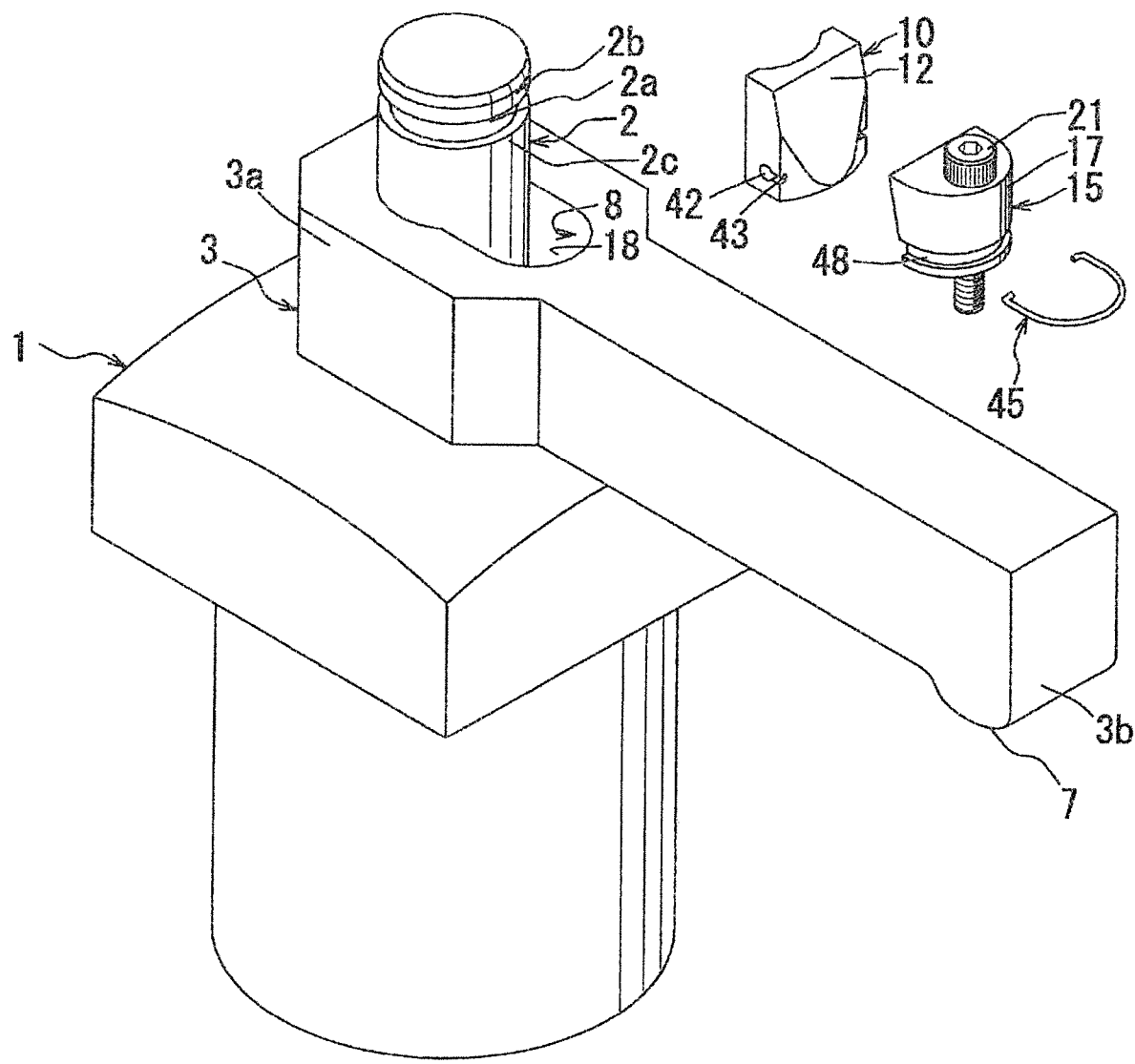
FIG. 12 shows Ninth Embodiment of the present invention, and is a diagram similar to FIG. 1.

Ninth Embodiment shown in FIG. 12 is different from First Embodiment in the following points.

An attachment hole 42 is provided on each of left and right side faces (both side faces) of the transmission member 10. An attachment groove 43 is provided so as to extend from each attachment hole 42 toward the first receiving surface 12. Furthermore, an accommodation groove 48 is provided in the circumferential direction on an outer periphery of the wedge member 15. The transmission member 10 and the wedge member 15 are connected to each other by a connecting member 45 so as to be movable relatively to each other in the vertical direction. The connecting member 45 is formed by a piano wire or spring material having a circular cross-section, and is bent into a U-shape. Both end portions of the connecting member 45 are bent toward the inside of the U-shape. A curved portion of the connecting member 45 is inserted into the accommodation groove 48 of the wedge member 15, and the end portions of the connecting member 45 are inserted into the attachment grooves 43 and the attachment holes 42 of the transmission member 10, with the result that the transmission member 10 and the wedge member 15 are connected to each other.

The height of the accommodation groove 48 of the wedge member 15 is designed so as to be larger than the diameter of the connecting member 45. This allows the connecting member 45 attached to the transmission member 10 to be guided by the accommodation groove 48 of the wedge member 15 in the vertical direction.

The above-described clamp arm 3 is attached to the clamp rod 2 through the following procedure.

Figure 13A:
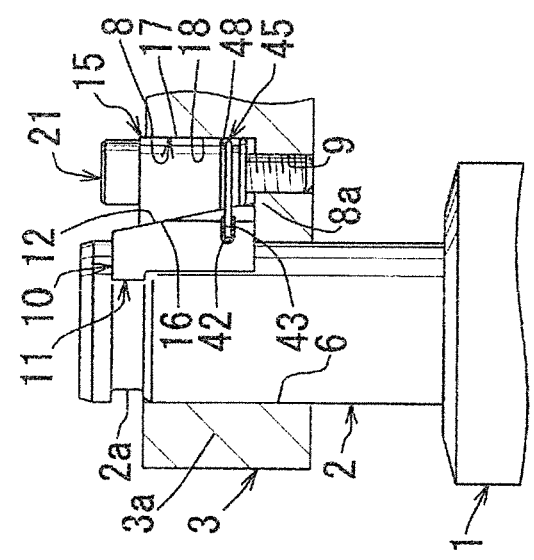
FIG. 13A to FIG. 13C are explanatory views illustrating the procedure for attaching the clamp arm to the clamp rod, and each is a diagram similar to FIG. 2.
Figure 13B:
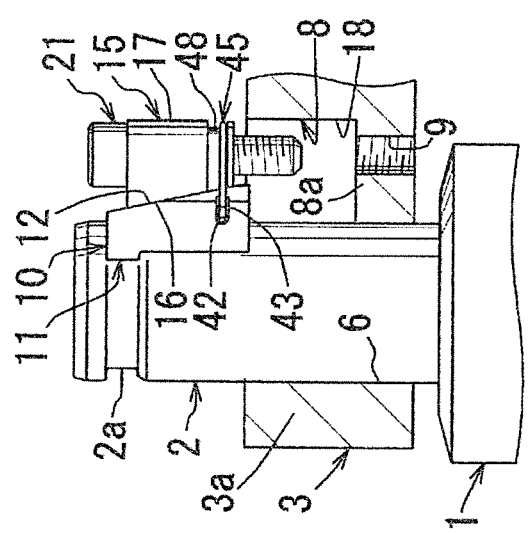

First of all, as shown in FIG. 13A, the clamp arm 3 is lowered from a position above the clamp rod 2, so that the attachment hole 6 of the clamp arm 3 is fitted over the clamp rod 2. Then, as shown in FIG. 13B, the protrusion 11 of the transmission member 10, which is connected to the wedge member 15 as described above, is inserted into the groove 2a of the clamp rod 2 from the right. Subsequently, as the clamp arm 3 is raised, the transmission member 10 and the wedge member 15 connected to each other is fitted into the accommodation hole 8 of the clamp arm 3. Furthermore, the tightening bolt 21 inserted in the bolt insertion hole 19 of the wedge member 15 is rotated and tightened into the bolt hole 9. As a result, the tightening bolt 21 presses the wedge member 15 downward, and the wedge member 15 presses the clamp rod 2 to the attachment hole 6 of the clamp arm 3 via the first pressing surface 16 and the first receiving surface 12 of the transmission member 10. Due to this, a reaction force from the attachment hole 6 is exerted onto the wedge member 15 via the clamp rod 2 and the transmission member 10, and the second pressing surface 17 of the wedge member 15 presses the second receiving surface 18 of the accommodation hole 8 of the clamp arm 3. Consequently, the clamp arm 3 is firmly fixed to the clamp rod 2.

Figure 14:
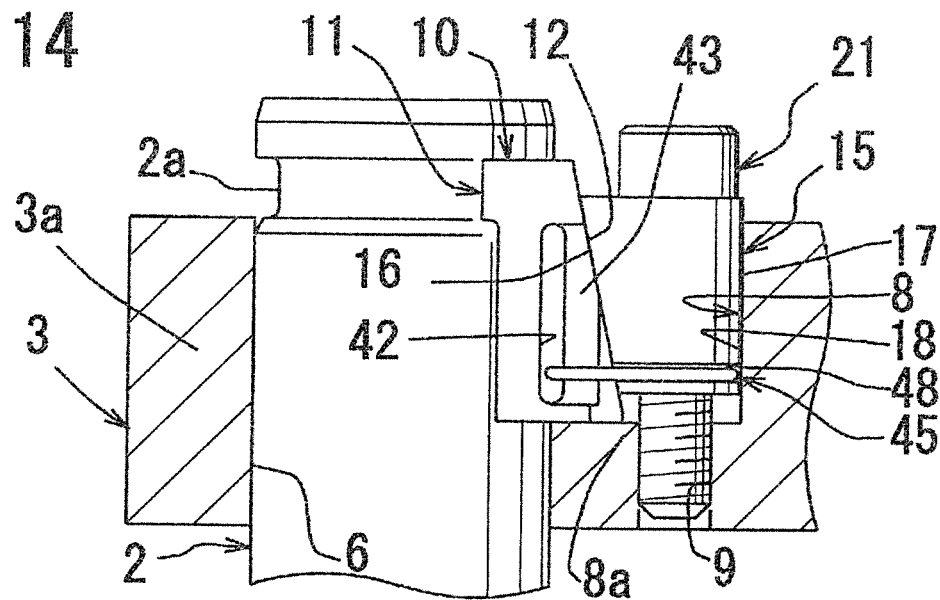
FIG. 14 shows First Modification of Ninth Embodiment of the present invention, and is a diagram similar to FIG. 13C.

First Modification of Ninth Embodiment, shown in FIG. 14, is different from Ninth Embodiment in the following points.

An elongated hole (attachment hole) 42 extending in the vertical direction is provided on each of both side faces of the transmission member 10. Note that FIG. 14 shows only one of the both side faces which is closer to a viewer. An attachment groove 43 is provided so as to extend from each attachment hole 42 toward the first receiving surface 12. The attachment grooves 43 are provided so as to extend in the vertical direction similarly to the attachment holes 42. The end portions of the U-shape connecting member 45 are inserted into the attachment grooves 43 and the attachment holes 42 of the transmission member 10 so as to be movable in the vertical direction.

Figure 13C:
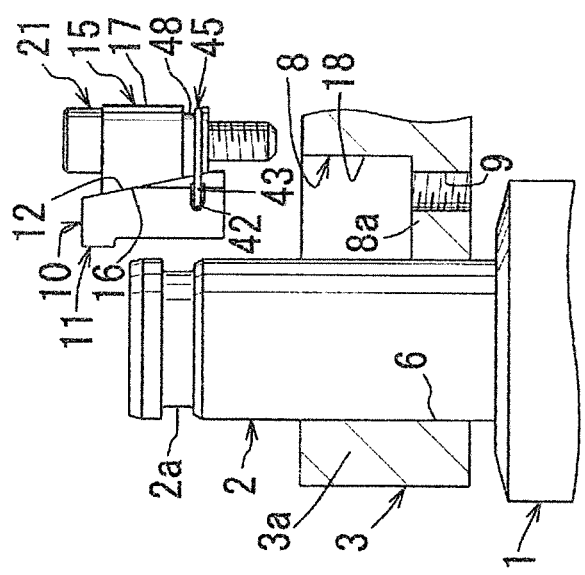

Each of the attachment holes 42 and the attachment grooves 43 of Ninth Embodiment shown in FIG. 12 to FIG. 13C has a short length in the vertical direction, in other words, has a dot-like configuration. Meanwhile, each of the attachment holes 42 and the attachment grooves 43 of First Modification shown in FIG. 14 has a configuration elongated in the vertical direction. This allows the transmission member 10 and the wedge member 15 connected to each other by the connecting member 45 to move greatly in the vertical direction relatively to each other.

Furthermore, the attachment holes 42 and the attachment grooves 43 are provided in the transmission member 10 so that the upper end portions of the attachment holes 42 and the attachment grooves 43 are positioned lower than the top surface of the clamp arm 3 when the clamp arm 3 is attached to the clamp rod 2. Due to this, after the clamp arm 3 is attached to the clamp rod 2, the attachment holes 42 and the attachment grooves 43 are covered by the accommodation hole 8 of the clamp arm 3, and this prevents foreign matters such as swarf from entering into the attachment holes 42 and the attachment grooves 43.

Figure 15:
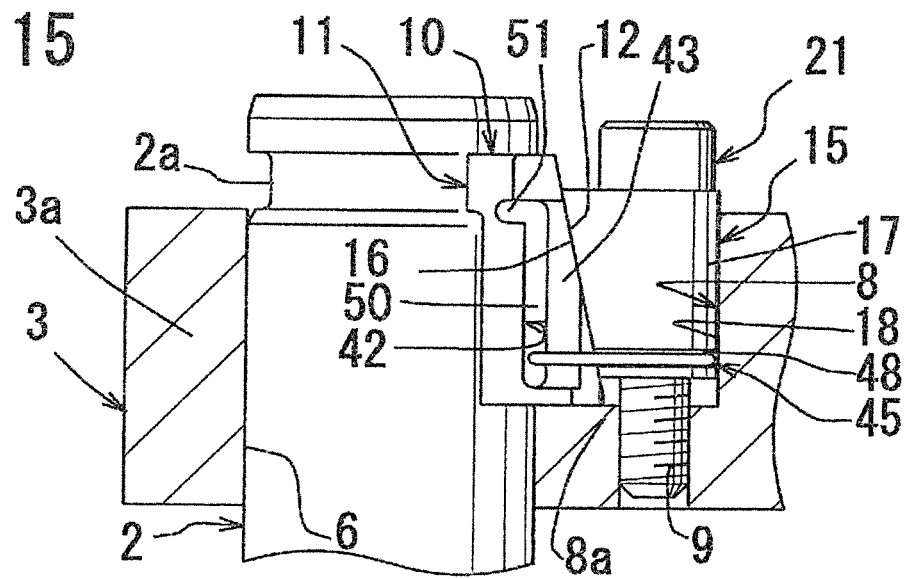
FIG. 15 shows Second Modification of Ninth Embodiment of the present invention, and is a diagram similar to FIG. 13C.

Second Modification of Ninth Embodiment, shown in FIG. 15, is different from First Modification shown in FIG. 14 in the following points.

The elongated hole (attachment hole) 42 extending in the vertical direction is provided on each of both side faces of the transmission member 10. Note that FIG. 15 shows only one of the both side faces which is closer to a viewer. Each elongated hole 42 includes a first attachment hole portion 50 extending in the vertical direction, and a second attachment hole portion 51 extending from an upper end portion of the first attachment hole portion 50 toward the protrusion 11.

Figure 16:
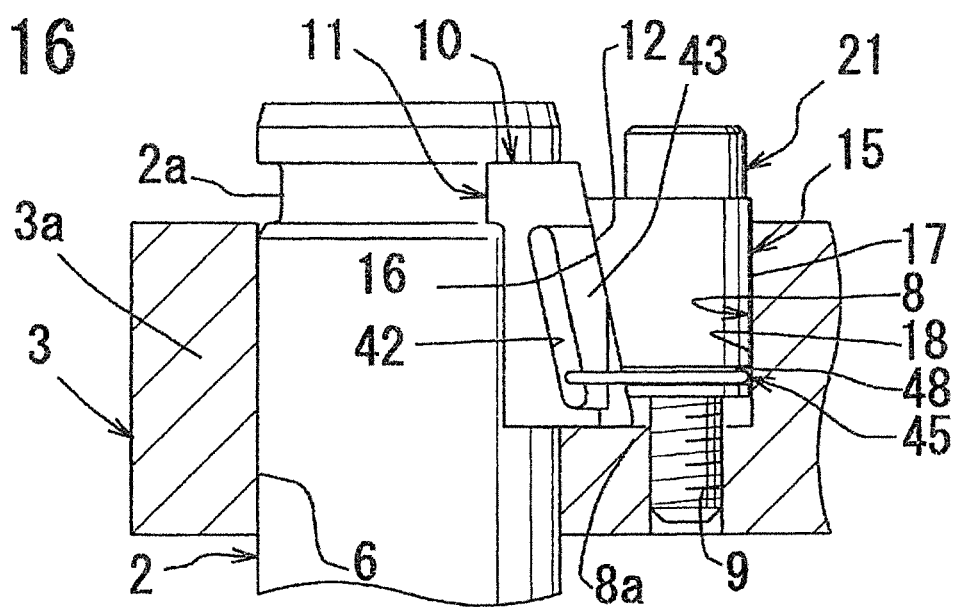
FIG. 16 shows Third Modification of Ninth Embodiment of the present invention, and is a diagram similar to FIG. 13C.

Third Modification of Ninth Embodiment, shown in FIG. 16, is different from First Modification shown in FIG. 14 in the following points.

The elongated hole (attachment hole) 42 extending in the vertical direction is provided on each of both side faces of the transmission member 10. Note that FIG. 16 shows only one of the both side faces which is closer to a viewer. The elongated hole 42 is provided so as to extend in a direction parallel to the first receiving surface 12 (in a direction inclined with respect to the vertical direction). The end portions of the U-shape connecting member 45 are inserted so as to be movable along the attachment grooves 43 of the transmission member 10, similarly to those in First Modification.

At the time of detaching the clamp arm 3 from the clamp rod 2, the wedge member 15 is raised straight upward out of the accommodation hole 8 of the clamp arm 3. Then, the end portions of the connecting member 45 push rightward the side walls of the attachment holes 42 of the transmission member 10, and this allows the protrusion 11 of the transmission member 10 to be taken out of the recess 2a of the clamp rod 2. This allows the transmission member 10 and the wedge member 15 to be taken out of the clamp rod 2.

The above-described embodiments are changeable as follows.

The clamping device may be a clamping device capable of rotating or capable of moving vertically, instead of the rotary clamp capable of rotating and moving vertically, which has been mentioned above by way of example.

The recess 2a may be an opening which opens onto the outer peripheral surface of the clamp rod 2, instead of the groove provided in the circumferential direction on the outer periphery of the clamp rod 2.

Furthermore, the cross-section of the recess 2a of the clamp rod 2 may have a shape other than the substantially quadrangular shape, such as an arc shape or triangular shape.

The cross-section of the protrusion 11 may have a shape other than the substantially quadrangular shape, such as an arc shape or triangular shape.

In the above-described embodiments, the first pressing surface 16 is provided at the left portion of the wedge member 15 so that the distance between the axis of the clamp rod 2 and the first pressing surface 16 increases downward, and the second pressing surface 17 is provided at the right portion of the wedge member 15 so as to extend straight in the vertical direction. However, instead of this arrangement, the arrangement of (1) or (2) below may be adopted.

(1) The first pressing surface 16 is provided at the left portion of the wedge member 15 so as to extend straight in the vertical direction, and the second pressing surface 17 is provided at the right portion of the wedge member 15 so that the distance between the axis of the clamp rod and the second pressing surface 17 decreases downward.

(2) The first pressing surface 16 is provided at the left portion of the wedge member 15 so that the distance between the axis of the clamp rod and the first pressing surface 16 increases downward, and the second pressing surface 17 is provided at the right portion of the wedge member 15 so that the distance between the axis and the second pressing surface 17 decreases downward.

Each of the first pressing surface 16, the second pressing surface 17, the first receiving surface 12, and the second receiving surface 18 may have an arc shape in a plan view instead of being shaped as a flat plane.

Instead of the arrangement in which the entirety of the recess 2a of the clamp rod 2 is provided above the upper end surface 3c of the clamp arm 3, only a part of the recess 2a of the clamp rod 2 may be provided above the upper end surface 3c of the clamp arm 3.

The protrusion 11 may be provided separately from the transmission member 10, instead of being provided unitarily with the transmission member 10.

The engagement surface 27 provided above the protrusion 11 on the transmission member 10 may be omitted.

The connecting member 45 may have a quadrangular cross-section or may be formed in a thin-plate-like shape, instead of having the circular cross-section.

Moreover, it is a matter of course that other changes or alterations can be made on the present invention within the scope of envisagement of one skilled in the art.

REFERENCE SIGNS LIST

1: housing; 2: clamp rod; 2a: recess (groove); 3: clamp arm; 3a: first end portion (left end portion); 3b: second end portion (right end portion); 3c: end surface (upper end surface); 6: attachment hole; 7: pushing portion; 8: accommodation hole; 8a: bottom portion; 10: transmission member; 11: protrusion; 12: first receiving surface; 15: wedge member; 16: first pressing surface; 17: second pressing surface; 18: second receiving surface; 19: bolt insertion hole; 20: lock portion; 21: tightening bolt; 24: engaging portion (engagement ball);

The invention claimed is:

1. An attachment and detachment structure for a clamp arm of a clamping device, the structure comprising:
 a clamp rod (2) inserted into a housing (1) so as to be movable between a leading end side of the housing (1) and a base end side of the housing (1), the clamp rod (2) including a recess (2a) provided at a leading end portion of the clamp rod (2);
 an upper wall (2b) formed on a leading end side of the recess (2a);
 a lower wall (2c) formed on a base end side of the recess (2a);
 a clamp arm (3) detachably attached to the clamp rod (2);
 an attachment hole (6) provided at a first end portion (3a) of the clamp arm (3) so as to pass through the first end portion (3a) between its leading end side and base end side;
 a pushing portion (7) provided at a second end portion (3b) of the clamp arm (3) and configured to be brought into contact with an object to be clamped;
 an accommodation hole (8) provided adjacent to the attachment hole (6) so as to be closer to the second end portion (3b) than the attachment hole (6), the accommodation hole (8) being open toward the leading end side;
 a transmission member (10) configured to be inserted in the accommodation hole (8), the transmission member (10) including a protrusion (11) which protrudes from a first-end-side portion of an outer periphery of the transmission member (10) and is configured to be fitted into the recess (2a), the first-end-side portion being close to the first end portion (3a); and
 a wedge member (15) shaped so as to taper narrower toward the base end side and configured to be inserted in the accommodation hole (8), wherein
 an engagement surface (28) is formed at a base end portion of the transmission member (10) to be brought into contact with the lower wall (2c) from a lateral side,
 an upper wall (11a) of the protrusion (11) is brought into contact with the upper wall (2b) from the base end side, and
 at a time of attaching the clamp arm (3) to the clamp rod (2), the wedge member (15) is pressed using a tightening bolt (21) toward the base end side, and thereby the wedge member (15) presses the attachment hole (6) via the transmission member (10) and the clamp rod (2), and presses the accommodation hole (8);
 wherein:
 a bolt insertion hole (19) is provided through the wedge member (15), and the tightening bolt (21) inserted into the bolt insertion hole (19) is screwed into a bottom portion (8a) of the accommodation hole (8);
 a lock portion (20) having a level difference is provided at a border between a large diameter portion and a small diameter portion constituting the bolt insertion hole (19); and
 at a time of detaching the clamp arm (3) from the clamp rod (2), the tightening bolt (21) is rotated and loosened, and thereby an engagement ball (24) provided at a midway portion of the tightening bolt (21) presses the lock portion (20) toward the leading end side.

2. The attachment and detachment structure according to claim 1, wherein:
 a first pressing surface (16) provided on a first-end-side portion of the wedge member (15) is configured to be brought into wedge engagement, from the leading end side, with a first receiving surface (12) provided on the transmission member (10), the first-end-side portion being close to the first end portion (3a); and
 a second pressing surface (17) provided on a second-end-side portion of the wedge member (15) is configured to be brought into engagement with a second receiving surface (18) provided in the accommodation hole (8), the second-end-side portion being close to the second end portion (3*b*).

3. The attachment and detachment structure according to claim 2, wherein the recess (2*a*) is formed by a groove provided in a circumferential direction on an outer periphery of the clamp rod (2).

4. The attachment and detachment structure according to claim 2, wherein at least a part of the recess (2*a*) of the clamp rod (2) is provided on the leading end side relative to a leading end surface (3*c*) of the clamp arm (3).

5. The attachment and detachment structure according to claim 2, wherein the transmission member (10) and the wedge member (15) are connected to each other by a connecting member (45) so as to be movable relatively to each other between the leading end side and the base end side.

6. The attachment and detachment structure according to claim 1, wherein the recess (2*a*) is formed by a groove provided in a circumferential direction on an outer periphery of the clamp rod (2).

7. The attachment and detachment structure according to claim 1, wherein at least a part of the recess (2*a*) of the clamp rod (2) is provided on the leading end side relative to a leading end surface (3*c*) of the clamp arm (3).

8. The attachment and detachment structure according to claim 1, wherein the transmission member (10) and the wedge member (15) are connected to each other by a connecting member (45) so as to be movable relatively to each other between the leading end side and the base end side.

\* \* \* \* \*